United States Patent Office 3,230,190
Patented Jan. 18, 1966

3,230,190
THERMOPLASTIC RESIN COMPOSITION CONTAINING A STEARIC ACID-POLYAMINE ANTISTATIC AGENT
Karl James Moulton and Thomas Wagner Findley, La Grange, Ill., assignors to Swift & Company, Chicago, Ill., a corporation of Illinois
No Drawing. Filed July 28, 1961, Ser. No. 127,466
4 Claims. (Cl. 260—23)

This invention relates to the production of antistatic plastics and more particularly to an improved process for imparting antistatic properties to synthetic polymers which normally tend to accumulate static charges.

In the production and fabrication of synthetic thermoplastic materials these thermoplastics often accumulate static charge on the surface thereof and this is particularly noticeable with films and extruded and molded objects which develop static charges during fabrication. Film which is not treated with antistatic agents is difficult to separate since sheets are held together by static charge. Accumulation of charges of static electricity, either during the fabrication of plastic articles or during the subsequent treatment of such articles in connection with various finishing operations, as well as in the course of the use of these articles, is objectionable because the charge attracts dust, dirt, and other foreign materials. Attempts to remove the adhering dust or dirt serve only to increase the charge. Destaticizing agents have been developed to inhibit the buildup of static or to remove the charge on such objects. Usually these destaticizing agents are applied to the surface of such objects or incorporated in the plastic before the formation of such objects.

In those cases where a static inhibiting agent is applied to the surface of the plastic object to minimize or retard the accumulation of charge the treatment is cumbersome, and where the agent must be applied from solution in organic solvents the operation may be hazardous.

When incorporated into the plastic formula many of the destaticizing agents suggested in the prior art have not provided sufficient inhibition of static development. In addition, many of these materials cannot be used where clear plastic objects or light colored plastic objects are desired because of discoloration in the plastic introduced by the destaticizing agent. Further, many of these known antistatic agents are not sufficiently unreactive or inert to insure that they do not react with other components of plastic formulations under the influence of elevated temperatures and/or pressure to form undesirable off-color. This is a particular problem if the destaticizing agent is an amine having a substantial number of free amine groups and is employed with vinyl halide resins. It appears that amines under the influence of elevated temperature serve to accelerate the decomposition and degradation of polymers containing substantial amounts of polymerized vinyl chloride.

It is, therefore, an object of this invention to provide destaticized thermoplastic polymers.

Another object of the invention is the provision of a method for imparting to synthetic thermoplastic polymers a high degree of resistance to the accumulation of static charge.

Still another object of the invention is the provision of synthetic polymers which are protected against static accumulation and which can be fabricated at elevated temperatures without the development of discoloration.

Additional objects, if not specifically set forth herein, will be readily apparent to those skilled in the art from the detailed description which follows.

Generally, the invention comprises the formulation of thermoplastic polymers having embodied therein or deposited on the surface of objects prepared from such polymers a destaticizing amount of the static inhibiting agent. The static inhibiting agent is a condensation product of higher fatty acids and aliphatic polyamine. The static inhibiting agent can be incorporated in the polymer composition prior to fabrication of objects from such composition providing an internally destaticized material or can be deposited on the surface of objects prepared from the composition. The antistatic agent is effective in inhibiting the accumulation of electrostatic charge on objects made up of a variety of thermoplastic polymers which, in the absence of such inhibitors, exhibit a build-up in charge.

More specifically, it is within the contemplation of the invention to treat synthetic thermoplastic polymers, either before or after formation of objects from such polymers, with a small but destaticizing amount of the condensation product prepared by reacting a higher fatty acid of 10–22 carbons with an aliphatic polyamine. The antistatic agent is very effective and it is possible to obtain static-free properties in the polymer with only a very small amount of the condensation product. Since such small amounts can be employed to obtain satisfactory results, the antistatic agent does not give rise to any problems in connection with discoloration of the plastic or incompatibility of the antistatic agent with the polymer. The antistatic agent can be incorporated in the polymer during formulation thereof or prior to formulation into film or other extruded objects and can also be incorporated into molding compositions prior to the molding operation. Moreover, the antistatic agent can be applied to the surface of plastic objects by deposition from a liquid carrier such as an organic solvent.

The destaticizing agent is prepared by heating and reacting a higher saturated or unsaturated fatty acid having 10–22 carbons with an alkylene polyamine such as tetraethylene pentamine until the acid reacts with the amine groups of the polyamine to form amido and amine salt configurations. Fatty acids and mixtures of fatty acids including capric acid, lauric acid, myristic acid, palmitic acid, stearic acid, arachidic acid, behenic acid, oleic acid, linoleic acid, linolenic acid, and eleostearic acid are very suitable as the acid moiety of the condensation product. Mixtures of fatty acids derived from animal, vegetable, and marine triglycerides may also be employed. Cottonseed fatty acids, soybean fatty acids, tall oil fatty acids, linseed oil fatty acids, tallow fatty acids, lard fatty acids, menhaden oil fatty acids can also be used to form the condensation product. These fatty acids are used in an amount sufficient to insure that at least one carboxyl group is provided to react with each of the amine groups of the polyamine. In the case of tetraethylene pentamine, 5 moles of fatty acid are employed for each mole of tetraethylene pentamine. The fatty acid and amine component are mixed and the mixture is heated and agitated until the carboxyl groups of the fatty acid react with the amino groups of the polyamine. Temperatures in excess of about 100° C. are recommended in forming the condensation product since the reaction involves the removal of water and even at 100° C. removal of water is very slow. Generally, the reaction temperature should not exceed about 200° C. although by use of subatmospheric and superatmospheric conditions it may be possible to obtain equivalent results using temperatures outside of this range. Also, the use of solvents and catalysts permits variations in reaction conditions. Usually the reaction is carried out in a reasonable amount of time in about 1–4 hours, if the reaction temperature is maintained around 100–200° C.

Thermoplastics which can be improved by treatment with the fatty acid-amine condensation product include polyethylene, polystyrene, and vinyl halide polymers and copolymers. The film properties of polyethylene films containing the fatty acid-amine condensation product of the invention are substantially improved. Vinyl polymers which can be improved markedly by use of the destaticizing agent include those polymers in which at least 50% of the monomer units before polymerization are vinyl halide units. This includes primarily vinyl halide polymers, such as polyvinyl chloride, polyvinyl bromide, polyvinyl fluoride, vinylidene chloride, vinyl chloride-vinylidene chloride copolymers, and vinyl chloride-vinyl acetate copolymers, as well as interpolymers or homopolymers of vinyl halides. Other vinyl-containing monomers which may be copolymerized with the vinyl halide include vinyl ketones such as vinyl butyl ketone, the acrylates and lower alkyl esters of maleic and fumaric acid. These compositions are well known in the art.

When employed as part of the polymer formulation, as little as 2 parts of the destaticizing agent for each 100 parts of the thermoplastic resin can be employed. Larger amounts up to around 10 parts for each 100 parts resin also provide desirable results although the use of more than about 5 parts antistatic agent for each 100 parts resin is not desirable inasmuch as the increased protection against static accumulation is not commensurate with the increased cost of the amount which is added. Different resins require different amounts of the destaticizing agent and those skilled in the art can readily determine the optimum amount for a given polymer.

When deposited on the surface of an object, the destaticizing agent is deposited in a continuous film from solution in an organic solvent. Suitable solvents include aliphatic hydrocarbons such as hexane, halogenated aliphatic hydrocarbons such as perchloroethylene, lower alkyl alcohols or mixtures of solvents in which the antistatic agent is soluble or readily dispersible and which has no effect on the plastic being treated.

A unique benefit provided by the antistatic agents of this invention flows from the potent antistatic properties of the agent. The condensation product provides satisfactory antistatic properties at levels at which other antistatic agents give little or no static elimination. The benefit of this high static eliminating effect is most notable where vinyl resins, particularly those containing predominant amounts of polymerized vinyl chloride, are treated. Vinyl chloride resins when subjected to elevated temperatures may undergo degradation and charring. The presence of free amino groups serves to promote such degradation. Thus, the destaticizing agents of the prior art which possess free amine groups serve to produce discoloration in such resins whereas the compositions of this invention do not adversely affect such resins.

The following example shows the preparation of an antistatic agent from a higher fatty acid and tetraethylene pentamine. This illustrative example is not to be considered as placing any limitation on the scope of the invention.

EXAMPLE I

Stearic acid (24.1 moles) was placed in a reaction vessel and the vessel was heated to a temperature of 135° C. to melt the stearic acid and the stearic acid was agitated while 4.83 moles of tetraethylene pentamine was gradually added. When the amine was added the batch temperature raised quickly to 180–190° C. and this temperature was maintained over a period of two hours. At the end of this time the condensation reaction was complete and the reaction product was quickly cooled by flaking on a chilled drum. The flaked reaction product was pulverized while being cooled and a pulverized product was recovered having a particle size such that it passed a hundred mesh screen. The reaction product contained 27.6% amino nitrogen represented by 3.6 amide groups per molecule. In other preparations it was discovered that the reaction is essentially complete with the optimum amide yield after 35 minutes reaction time at a temperature slightly above 150° C.

The condensation product was incorporated in a dry blend and the destaticizing effect of this product was compared to various known antistatic agents, as follows. The dry blend was made up of the following:

| | Parts |
|---|---|
| Polyvinyl chloride resin | 100 |
| Butyl esters of epoxidized linseed oil fatty acids | 10 |
| Barium-cadmium laurate stabilizer | 1 |
| Organic phosphite chelating agent | 1 |
| Organic cadmium salt stabilizer | ½ |
| Antistatic agent | 2 |

Various antistatic agents, as well as the condensation product prepared in accordance with the procedure of Example I, were employed in preparing several dry blends. In each case the dry blend was fused on a rubber mill and a film was extruded.

The films were tested on a static testing machine by wrapping the test film on a driving metal drum and also wrapping a piece of the same film on a metal idler drum which contacts the driving metal drum. The films on the drums are in mutual contact and the drums are rotated at about 40 revolutions per minute. A brass pick-up roller riding on the driving drum film picks up the static charge and this charge is registered on a sensitive open grid volt meter which is connected to the pick-up roller.

The films to be tested are wrapped around the idler and driving drums and the drums are rotated with the pick-up roller riding on the driving drum film. The lead from the pick-up roller is connected to ground and the drums are rotated for two minutes to discharge the initial static. At the end of this time the lead from the pick-up roller is removed from ground and the static developed during rotation of the drums for one minute is measured on the open grid volt meter. It has been found that a film which develops a maximum of four electrostatic volts per minute is substantially static-free. In the table which follows the electrostatic volts developed in several test films having various antistatic agents embodied therein is recorded and the static charge developed is compared to that developed in a film containing as the antistatic agent the composition of Example I.

*Table I*

| Antistatic Agent | Electrostatic Volts/Min. | Color |
|---|---|---|
| Composition of Example I | 3.5 | Very good. |
| Stearamide | 5.5 | Very good, but fumes. |
| Amino Palmitic Acid | 7 | Very poor—fumes. |
| N,N′ Distearoyl Ethylene Diamine | 9 | Poor. |
| Stearoyl Sarcosine | 10 | Fair. |
| Lauroyl Sarcosine | 15 | Do. |
| Oleoyl Sarcosine | 19 | Do. |
| Polyethoxylated Fatty Acids | 19 | Very good. |
| Stearamidopropyl Dimethyl-Beta hydroxyethyl Ammonium Dihydrogen Phosphate | 29 | Do. |
| Stearamido Propyl Dimethyl Beta hydroxyethyl Ammonium Nitrate | 32 | Poor. |
| Stearic Acid | 12 | Good. |

The table demonstrates that a composition of the present invention is far superior to those of the prior art, both in inhibiting the development of static charge and also in insuring that good color in the film is retained.

The destaticizing agents of the invention have been found to be very compatible with plasticizers, stabilizers and lubricants conventionally employed in making plastic films, and this freedom from reaction with other materials ordinarily used in the formulation of plastics represents an additional advantage provided by the instant destaticizing compositions.

Obviously many modifications and variations of the invention as hereinbefore set forth may be made with-

We claim:

1. A synthetic plastic having anistatic properties comprising a thermoplastic resin composition having a tendency to accumulate a static charge and a static-inhibiting amount of a condensation product obtained by condensing 1 mole tetraethylene pentamine with at least about 5 moles stearic acid.

2. A thermoplastic resin composition protected against static accumulation comprising polyvinyl chloride and a static inhibiting amount of an antistatic agent comprising the condensate of at least five moles stearic acid and one mole tetraethylene pentamine.

3. A thermoplastic composition protected against the development of electrical charge comprising polystyrene resin and a static inhibiting amount of the condensation product of 1 mole tetraethylene pentamine and 5 moles of stearic acid.

4. A polyethylene composition protected against the development of electrical charge comprising polyethylene resin and a static-inhibiting amount of the condensation product obtained by condensing 1 mole tetraethylene pentamine with at least 5 moles of stearic acid.

References Cited by the Examiner
UNITED STATES PATENTS

| | | | |
|---|---|---|---|
| 2,380,925 | 8/1945 | Cheyney | 260—32.6 |
| 2,464,855 | 3/1949 | Duggan et al. | 260—32.6 |
| 2,843,557 | 8/1958 | Safford | 260—23 |
| 3,025,257 | 3/1962 | Coler et al. | 260—32.6 |

LEON J. BERCOVITZ, *Primary Examiner.*

M. STERMAN, *Examiner.*